United States Patent
Shingyoji

(10) Patent No.: US 10,254,410 B2
(45) Date of Patent: Apr. 9, 2019

(54) POSITIONING CONTROL METHOD, POSITIONING DEVICE AND STORAGE MEDIUM

(71) Applicant: CASIO COMPUTER CO., LTD., Tokyo (JP)

(72) Inventor: Ryuji Shingyoji, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 276 days.

(21) Appl. No.: 15/244,155

(22) Filed: Aug. 23, 2016

(65) Prior Publication Data

US 2017/0090035 A1 Mar. 30, 2017

(30) Foreign Application Priority Data

Sep. 24, 2015 (JP) .................................. 2015-187400

(51) Int. Cl.
*G01S 19/14* (2010.01)
*G01S 19/24* (2010.01)
*G01S 19/34* (2010.01)

(52) U.S. Cl.
CPC .............. *G01S 19/14* (2013.01); *G01S 19/24* (2013.01); *G01S 19/34* (2013.01)

(58) Field of Classification Search
CPC .......... G01S 19/14; G01S 19/24; G01S 19/34; G01S 19/35; G01S 5/0027; G01S 2205/002
USPC .................................................... 342/357.52
See application file for complete search history.

(56) References Cited

U.S. PATENT DOCUMENTS

| | | | | |
|---|---|---|---|---|
| 6,522,636 B1* | 2/2003 | Hogberg | ............ | H04B 7/18519 370/316 |
| 2009/0278741 A1* | 11/2009 | Miyata | ..................... | G01S 19/24 342/357.64 |
| 2010/0054087 A1 | 3/2010 | Matsuzaki | | |
| 2010/0194632 A1* | 8/2010 | Raento | .............. | H04M 1/72572 342/357.25 |
| 2012/0176868 A1 | 7/2012 | Matsuzaki | | |
| 2014/0285377 A1* | 9/2014 | Toda | ........................ | G01S 19/27 342/357.74 |
| 2014/0292564 A1* | 10/2014 | Park | ........................ | G01S 19/27 342/357.2 |

FOREIGN PATENT DOCUMENTS

| JP | 2001-074826 A | 3/2001 | | |
|---|---|---|---|---|
| JP | 2014182119 A | * 9/2014 | ............ | G01S 19/34 |
| JP | 5614548 B2 | 10/2014 | | |

* cited by examiner

*Primary Examiner* — Harry K Liu
(74) *Attorney, Agent, or Firm* — Scully, Scott, Murphy & Presser, P.C.

(57) ABSTRACT

A positioning control method includes: determining whether a battery charge level is equal to or lower than a threshold; requesting an external device to acquire at least one positioning satellite information item according to a signal reception state of positioning satellites at a current location, from among positioning satellite information items of detectable positioning satellites, within a valid period of the positioning satellite information items, when the determining determines that the battery charge level is equal to or lower than the threshold; acquiring the at least one positioning satellite information item according to the requesting; and positioning the current location based on the acquired positioning satellite information item.

17 Claims, 9 Drawing Sheets

POSITIONING CONTROL METHOD, POSITIONING DEVICE AND STORAGE MEDIUM

CROSS-REFERENCE TO RELATED APPLICATIONS

This application is based upon and claims the benefit of priority from the prior Japanese Patent Application No. 2015-187400, filed Sep. 24, 2015, and the entire contents of which are incorporated herein by reference.

BACKGROUND OF THE INVENTION

1. Field of the Invention

The present invention relates to a positioning control method, a positioning device, and a storage medium.

In the related art, there are known GPS loggers for logging the locations of terminals by performing GPS-based positioning.

Such a GPS logger has a small size, and uses a battery having small capacity; and may be required to perform logging for a long time. However, since a GPS-signal receiving operation requires a large amount of electricity as much as several tens mW, if the GPS logger consecutively performs the GPS-signal receiving operation, the life of the battery shortens. For this reason, GPS loggers configured to intermittently perform a GPS-signal receiving operation in order to suppress the power consumption are used (see JP-A-2001-74826 and JP-B-5614548).

However, in order to always maintain a short-time positioning (so-called hot start) mode for receiving a signal within several seconds, in view of various situations, such as cases where positioning is impossible due to poor signal reception conditions, and cases where new satellites appear it is required to intermittently and sequentially perform signal reception for about 1 minute to 3 minutes at intervals of about 30 minutes. Otherwise, it is impossible to always update ephemerides necessary for short-time positioning, and the lives of batteries are greatly influenced. Also, in a case of acquiring an ephemeris by actual measurement, only the ephemerides of satellites visible from such a GPS logger are acquired. Therefore, after updating of the ephemerides, even though a new satellite appears, the new satellite cannot be used for short-time positioning, and thus influences the accuracy of positioning. Also, this situation is not limited to a GPS, and is common to other positioning systems such as GLONASS of Russia, Galileo of Europe, and Beidou of China.

SUMMARY OF THE INVENTION

The present invention was made in view of the above described circumstances, and an object of the present invention is to implement short-time positioning with low power consumption.

A positioning control method of an aspect of the invention includes: determining whether a battery charge level is equal to or lower than a threshold; requesting an external device to acquire at least one positioning satellite information item according to a signal reception state of positioning satellites at a current location, from among positioning satellite information items of detectable positioning satellites, within a valid period of the positioning satellite information items, when the determining determines that the battery charge level is equal to or lower than the threshold; acquiring the at least one positioning satellite information item according to the requesting; and positioning the current location based on the acquired positioning satellite information item.

DETAILED DESCRIPTION OF THE PREPARED EMBODIMENT

Hereinafter, an embodiment of the present invention will be described with reference to the accompanying drawings.

System Configuration

Figure 1:
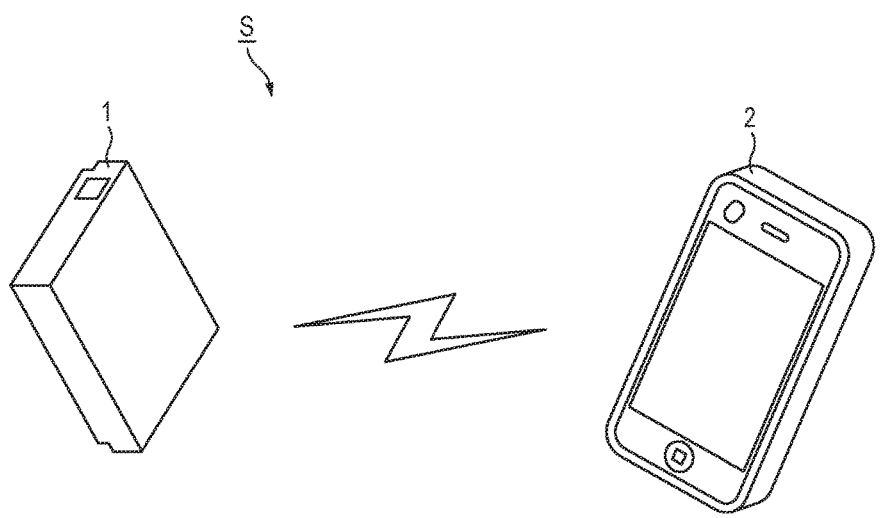
FIG. 1 is a schematic diagram illustrating the system configuration of a GPS receiver system according to an embodiment of the present invention.

FIG. 1 is a schematic diagram illustrating the system configuration of a GPS receiver system according to an embodiment of the present invention.

As shown in FIG. 1, a GPS receiver system S is configured so as to include a GPS logger 1 and a smart phone 2, and the GPS logger 1 and the smart phone 2 are configured so as to be capable of communication using near field communication such as Bluetooth (a trademark).

Hardware Configuration

Figure 2:
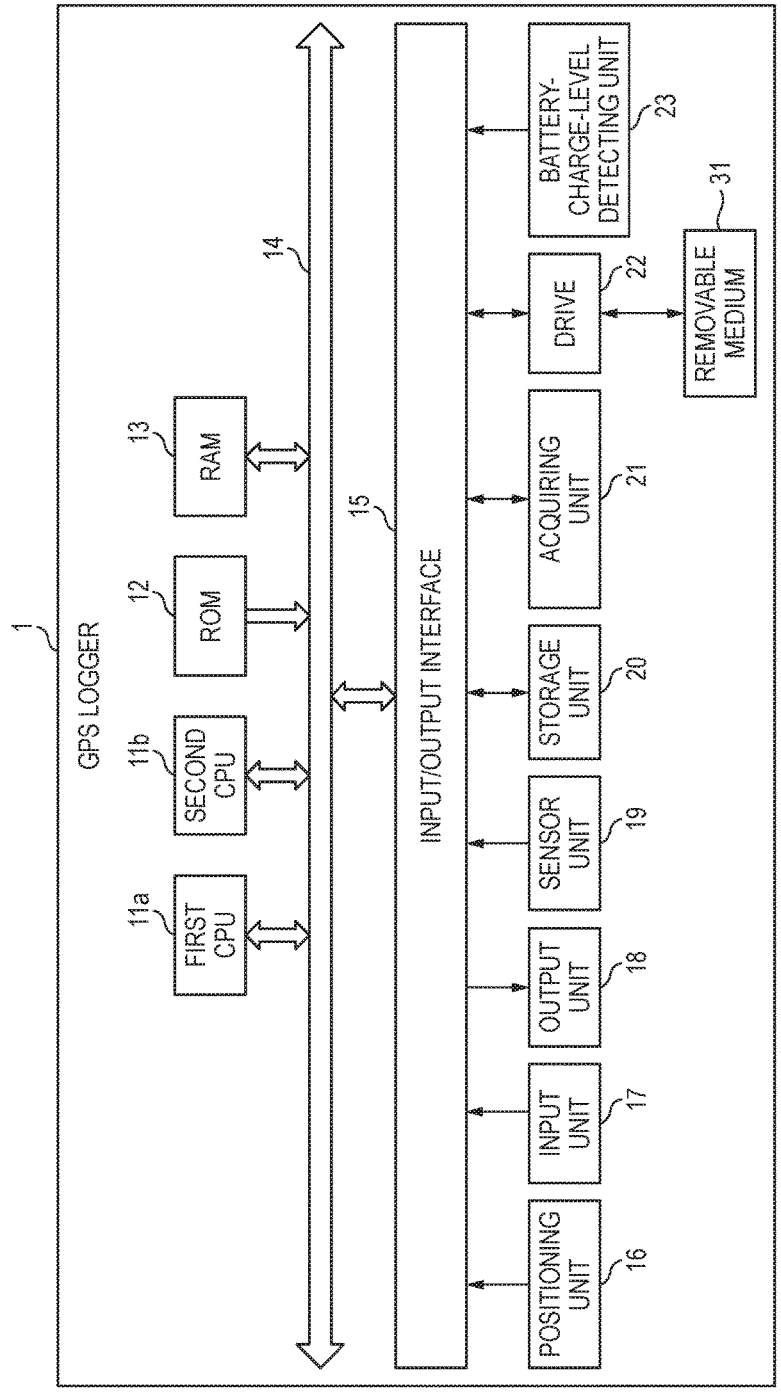
FIG. 2 is a block diagram illustrating the hardware configuration of a GPS logger according to the embodiment of the present invention.

FIG. 2 is a block diagram illustrating the hardware configuration of the GPS logger 1 according to the embodiment of the present invention.

The GPS logger 1 is configured, for example, as a GPS POD.

The GPS logger 1 includes a first central processing unit (CPU) 11$a$, a second CPU 11$b$, a read only memory (ROM) 12, a random access memory (RAM) 13, a bus 14, an input/output interface 15, a positioning unit 16, input unit 17, an output unit 18, a sensor unit 19, a storage unit 20, an acquiring unit 21, a drive 22, and a battery-charge-level detecting unit 23.

The first CPU 11$a$ controls the operation of the whole of the GPS logger 1, and performs a variety of processing according to a program recorded in the ROM 12 or a program loaded from the storage unit 20 into the RAM 13.

The second CPU 11b mainly controls an intermittent GPS-signal reception operation by performing a positioning control process to be described below. The second CPU 11b is configured by low-power-consumption hardware having an operation frequency lower than that of the first CPU 11a. Also, the function of the second CPU 11b may be implemented by a field programmable gate array (FPGA) or an application specific integrated circuit (ASIC).

Also, the first CPU 11a and the second CPU 11b may be configured in a single CPU.

In the RAM 13, data necessary for the first CPU 11a or the second CPU 11b to perform a variety of processing is also appropriately stored.

The first CPU 11a, the second CPU 11b, the ROM 12, and the RAM 13 are connected to one another through the bus 14. The bus 14 is also connected to the input/output interface 15. The input/output interface 15 is connected to the positioning unit 16, the input unit 17, the output unit 18, the sensor unit 19, the storage unit 20, the acquiring unit 21, the drive 22, and the battery-charge-level detecting unit 23.

The positioning unit 16 includes a GPS receiver, and detects the location (latitude, longitude, and altitude) of the GPS logger 1, and the current time which is indicated by a GPS, based on GPS signals received from GPS satellites. Also, the positioning unit 16 outputs information representing the detected location and the detected current time, to the first CPU 11a or the second CPU 11b.

The input unit 17 is composed of components such as buttons, and inputs a variety of information according to user's instruction operations.

The output unit 18 is composed of a display, a speaker, and the like, and outputs images and sound.

The sensor unit 19 includes various sensors such as a gyro sensor, an acceleration sensor, and a geomagnetic sensor, and detects the posture of the GPS logger 1, movement or bearing of the GPS logger 1, and the like.

The storage unit 20 is composed of a hard disk, a flash memory, or the like, and is for storing programs to be executed by the first CPU 11a or the second CPU 11b, a variety of data (such as ephemeris data of the GPS, and data on results of positioning based on the GPS).

The acquiring unit 21 controls communication with other devices (not shown) through a network including the Internet. Also, the acquiring unit 21 controls communication with other devices using near field communication such as Bluetooth.

In the drive 22, a removable medium 31 composed of a magnetic disk, an optical disk, a magneto-optical disk, or a semiconductor memory can be appropriately installed. The drive 22 can read out programs from the removable medium 31, and the read programs can be installed in the storage unit 20, if necessary. Also, similarly to the storage unit 20, the removable medium 31 can be used to store a variety of data, such as image data stored in the storage unit 20.

The battery-charge-level detecting unit 23 detects the battery charge level of the GPS logger 1, and outputs information representing the detected battery charge level, to the first CPU 11a and the second CPU 11b.

Now, the hardware configuration of the smart phone 2 will be described.

Figure 3:
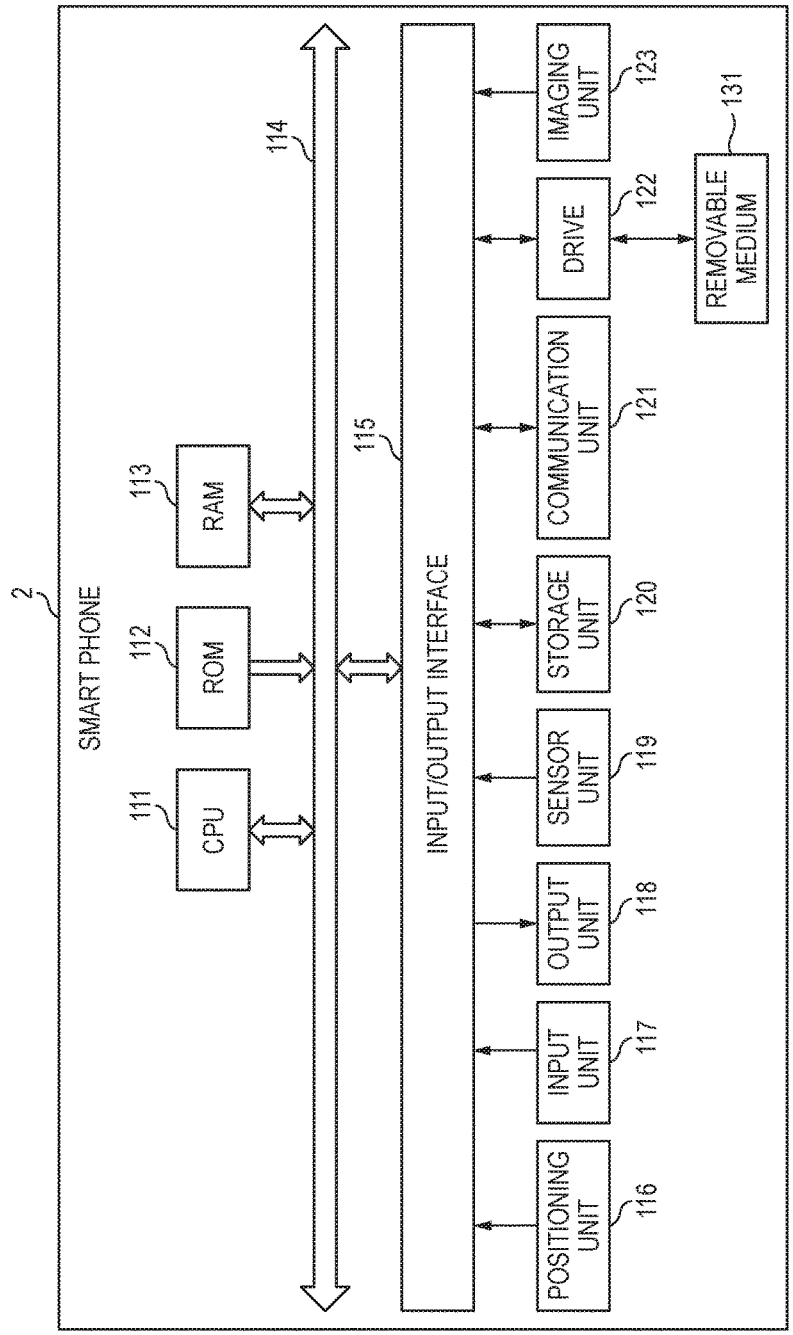
FIG. 3 is a block diagram illustrating the hardware configuration of a smart phone according to the embodiment of the present invention.

FIG. 3 is a block diagram illustrating the hardware configuration of the smart phone 2 according to the embodiment of the present invention.

The smart phone 2 includes a CPU 111, a ROM 112, a RAM 113, a bus 114, an input/output interface 115, a positioning unit 116, an input unit 117, an output unit 118, a sensor unit 119, a storage unit 120, a communication unit 121, a drive 122, and an imaging unit 123.

These components except for the imaging unit 123 are identical to corresponding hardware components of the GPS logger 1 shown in FIG. 2.

The imaging unit 123 includes an optical lens unit and an image sensor although they are not shown in FIG. 2.

The optical lens unit is composed of light condensing lenses such as a focus lens and a zoom lens for imaging subjects.

The focus lens is a lens for forming an image of a subject on the light receiving surface of the image sensor. The zoom lens is a lens for freely changing a focal length within a predetermined range.

The optical lens unit can include a peripheral circuit for adjusting setting parameters such as focus, exposure, and white balance, if necessary.

The image sensor is composed of a photoelectric conversion element, an analog front end (AFE), and the like.

The photoelectric conversion element is composed of, for example, a CMOS (complementary metal-oxide-semiconductor) type photoelectric conversion element. Images of subjects from the optical lens unit enter the photoelectric conversion element. Then, the photoelectric conversion element performs photoelectric conversion (imaging) on the subject images, thereby obtaining image signals, and accumulates the image signals for a predetermined time, and subsequently supplies the accumulated image signals as analog signals to the AFE.

The AFE performs a variety of signal processing such as A/D (Analog/Digital) conversion on the analog image signals, thereby generating digital signals. The digital signals are output as output signals of the imaging unit 123.

These output signals of the imaging unit 123 are appropriately supplied to the CPU 111 and the like.

Functional Configuration

Figure 4:
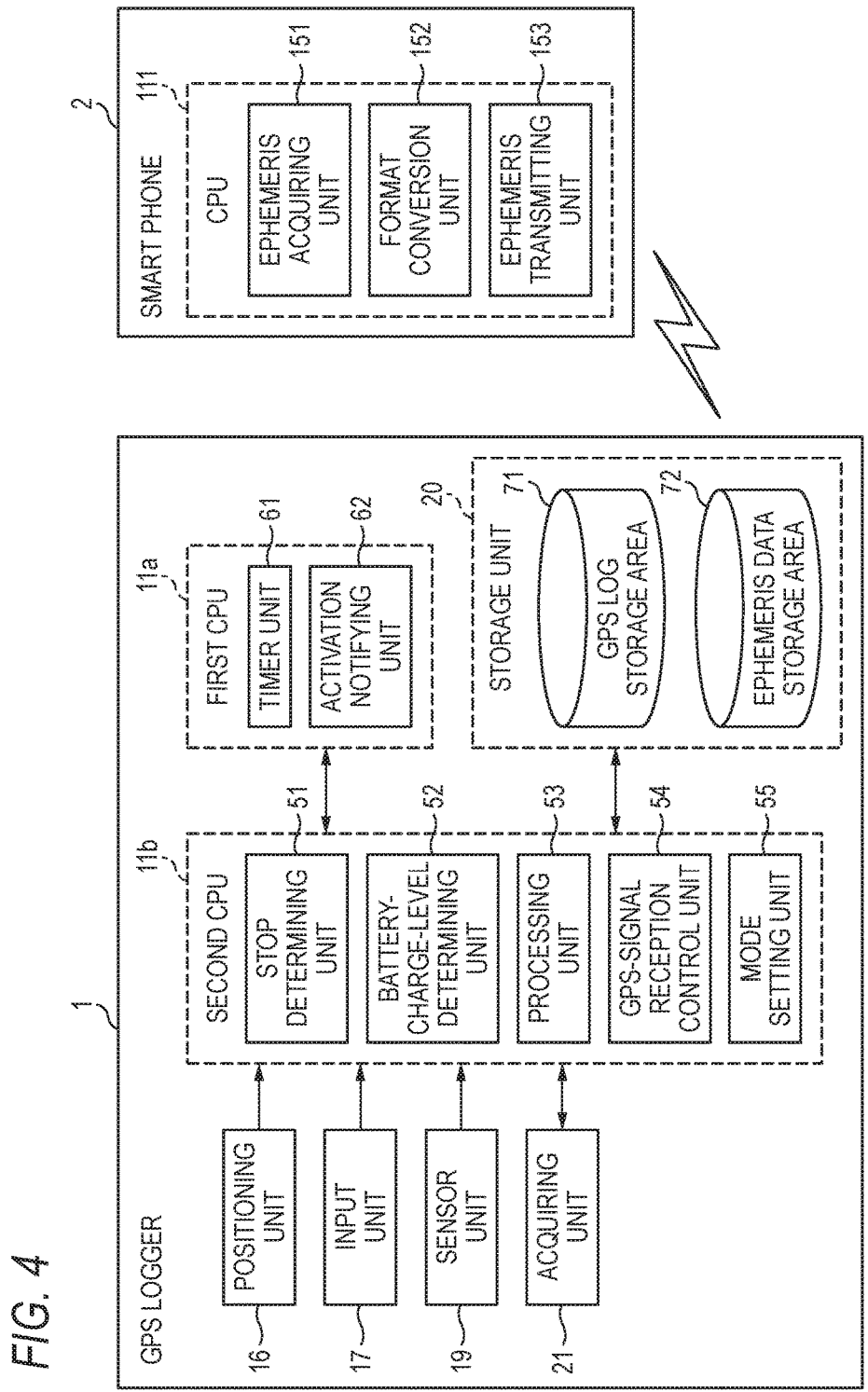
FIG. 4 is a functional block diagram illustrating some of the functional components of the GPS logger and the smart phone of FIG. 1 for performing a positioning control process.

FIG. 4 is a functional block diagram illustrating functional components which are some of the functional components of the GPS logger 1 and the smart phone 2 as described above and are for performing a positioning control process.

The positioning control process means a series of processes for acquiring ephemeris data from the smart phone 2, and intermittently receiving GPS signals and performing short-time positioning (hot start) by using the ephemeris data. Also, in a case where the positioning control process is performed, the positioning function of the smart phone 2 is switched to a mode in which constant positioning is not performed (that is, an OFF mode or a mode for performing positioning only when required), and thus the power consumption decreases.

In the case where the positioning control process is performed, as shown in FIG. 4, in the second CPU 11b of the GPS logger 1, a stop determining unit 51, a battery-charge-level determining unit 52, a processing unit 53, a GPS-signal reception control unit 54, and a mode setting unit 55 act. Also, in the first CPU 11a of the GPS logger 1, a timer unit 61 and an activation notifying unit 62 act. Further, in the CPU 111 of the smart phone 2, an ephemeris acquiring unit 151, a format conversion unit 152, and an ephemeris transmitting unit 153 act.

Also, in the storage unit 20 of the GPS logger 1, a GPS log storage area 71 and an ephemeris data storage area 72 are set.

In the GPS log storage area 71, location data acquired by GPS-based positioning is stored.

In the ephemeris data storage area 72, ephemeris data acquired from the sample cassette 23, or ephemeris data acquired by receiving GPS signals is stored.

The stop determining unit 51 determines whether the GPS logger 1 is still, based on the result of detection of the sensor unit 19. For example, in a case where the detection results of the gyro sensor and the acceleration sensor of the sensor unit 19 are maintained at values equal to or less than predetermined values for a predetermined time, the stop determining unit 51 determines that the GPS logger 1 is still.

The battery-charge-level determining unit 52 determines whether the battery charge level is lower than a predetermined threshold, based on battery charge level information input from the battery-charge-level detecting unit 23.

The processing unit 53 requests the smart phone 2 to transmit ephemeris data items to be used for GPS-based positioning. At this time, the processing unit 53 determines predetermined request conditions, and changes the number of ephemeris data items to be requested, based on the determination result.

Specifically, the request conditions are as follow.

(1) A condition that it should be possible to specify the current location by the smart phone 2.

(2) A condition that it should be possible to specify the current location based on the result of the latest GPS-based positioning.

(3) A condition that the current location should be a commanding place such as a park (that is, the signal reception condition should be good).

(4) A condition that a GPS antenna should be directed toward the sky.

On the result of determination on these conditions, the processing unit 53 performs switching to any one of the following request contents.

(A) Only the ephemeris data items of GPS satellites existing at an intermediate elevation angle (for example, 45°) or greater and capturable within the valid period of ephemeris (for example, 4 hours).

(B) Only the ephemeris data items of all GPS satellites capturable within the valid period of ephemerides.

(C) The ephemeris data items of all GPS satellites.

For example, in a case where the condition (1) is not satisfied, and the condition (2) is also not satisfied, the processing unit 53 makes a request having the content (C).

Meanwhile, in a case where all of the conditions (1), (3), and (4) are satisfied, the processing unit 53 makes a request having the content (A).

Otherwise, the processing unit 53 makes a request having the content (B).

If the number of ephemeris data items to be requested is changed as described above, the numbers of search engines and tracking engines to operate during GPS-based positioning of the positioning unit 16 change. Here, search engines are circuits for detecting signals from GPS satellites (circuits for performing satellite capturing operations). Also, tracking engines are circuits for maintaining synchronization of signals detected by the search engines, and decoding navigation messages, and obtaining delay times (pseudo distances) from satellites to the receiver, and so on (circuits for performing satellite tracking operations).

For example, if the number of ephemeris data items necessary for GPS-based positioning corresponds to 16 satellites, the numbers of search engines and tracking engines which need to be operated for GPS-based positioning are changed to correspond to 16 channels. Also, if the number of ephemeris data items necessary for GPS-based positioning corresponds to 6 satellites, the numbers of search engines and tracking engines which need to be operated for GPS-based positioning are changed to correspond to 6 channels.

Like this, if the number of ephemeris data items necessary for GPS-based positioning is changed, the number of search engines and the number of tracking engines for GPS-based positioning are changed. As a result, it becomes possible to perform GPS-based positioning with lower power consumption.

The GPS-signal reception control unit 54 performs control such that the positioning unit 16 intermittently performs GPS signal reception (GPS-based positioning). Specifically, in a case where an activation notification signal is input from the activation notifying unit 62, the GPS-signal reception control unit 54 performs GPS signal reception. Also, in a case where an instruction for GPS signal reception is input from the input unit 17, the GPS-signal reception control unit 54 performs GPS signal reception.

In the present embodiment, if the GPS-signal reception control unit 54 receives ephemeris data items from the smart phone 2, it is able to perform short-time positioning (hot start) at long intervals (here, at intervals of 120 minutes).

The mode setting unit 55 sets intervals of intermittent GPS-signal reception, and sets the mode of the GPS logger 1 for GPS signal reception (such as turning on or off of the communication mode using Bluetooth).

In a case where the mode setting unit 55 has set intervals of intermittent GPS-signal reception, the timer unit 61 measures a time until reception of the next GPS signal.

In a case of determining that the time required until reception of the next GPS signal has elapsed, with reference to the measured result of the timer unit 61, the activation notifying unit 62 outputs an activation notification signal for notifying the second CPU 11*b* that it is the timing to receive a GPS signal.

The ephemeris acquiring unit 151 acquires ephemeris data items from a cell tower or the like. For example, the ephemeris data items can be extracted from assist data of an assisted global positioning system (A-GPS).

The format conversion unit 152 converts the format of the ephemeris data items acquired by the ephemeris acquiring unit 151, into a format usable in the GPS logger 1.

After the format conversion unit 152 performs format conversion on the ephemeris data items, the ephemeris transmitting unit 153 transmits the ephemeris data items to the GPS logger 1 by near field communication such as Bluetooth.

[Operation]

Now, the operation of the GPS receiver system S will be described.

Figure 5:
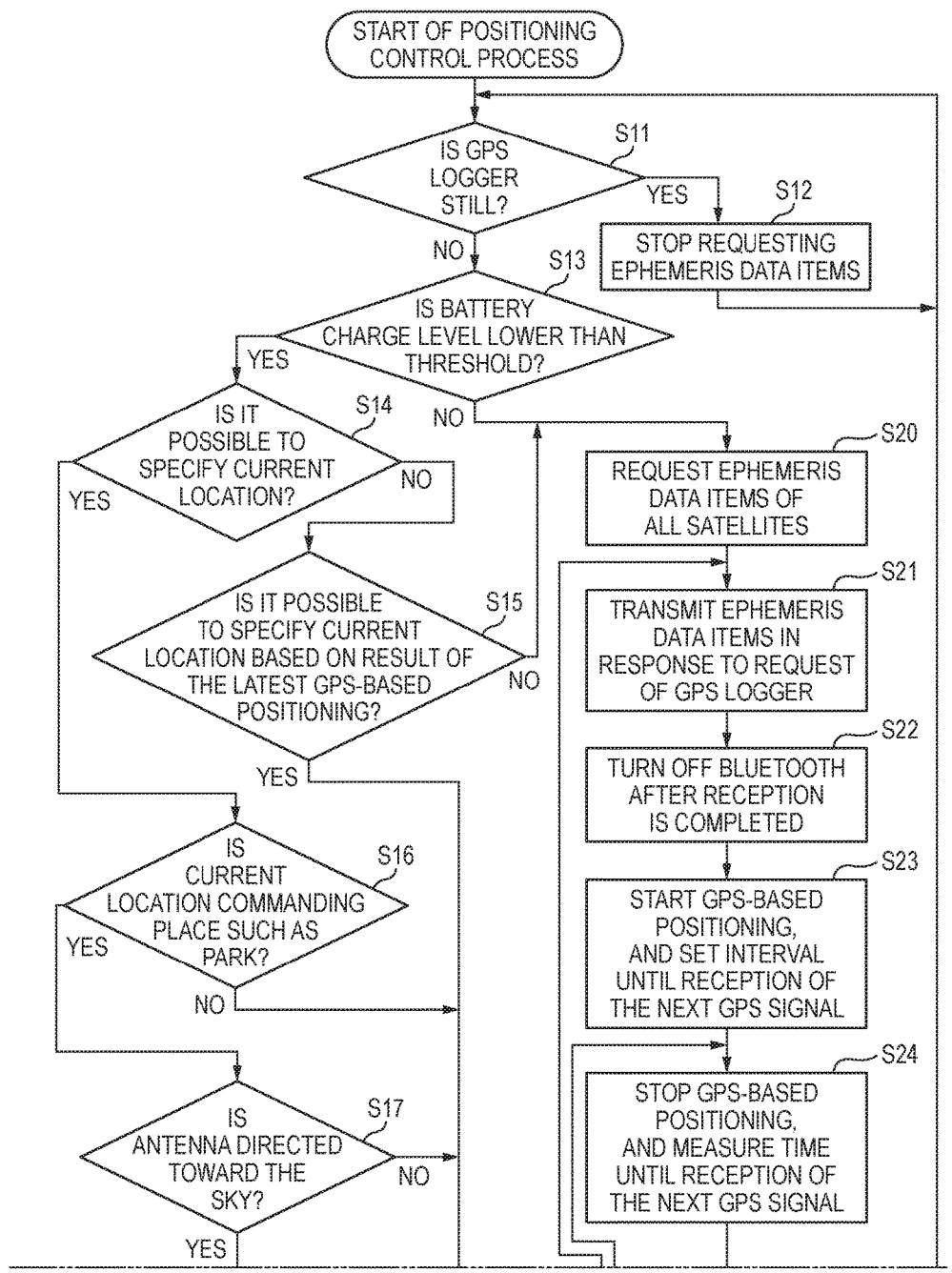
FIG. 5 is a flow chart for explaining the flow of the positioning control process which is performed by the GPS logger 1 and the smart phone 2 shown in FIG. 2 and having the functional components of FIG. 4.
Figure 5:
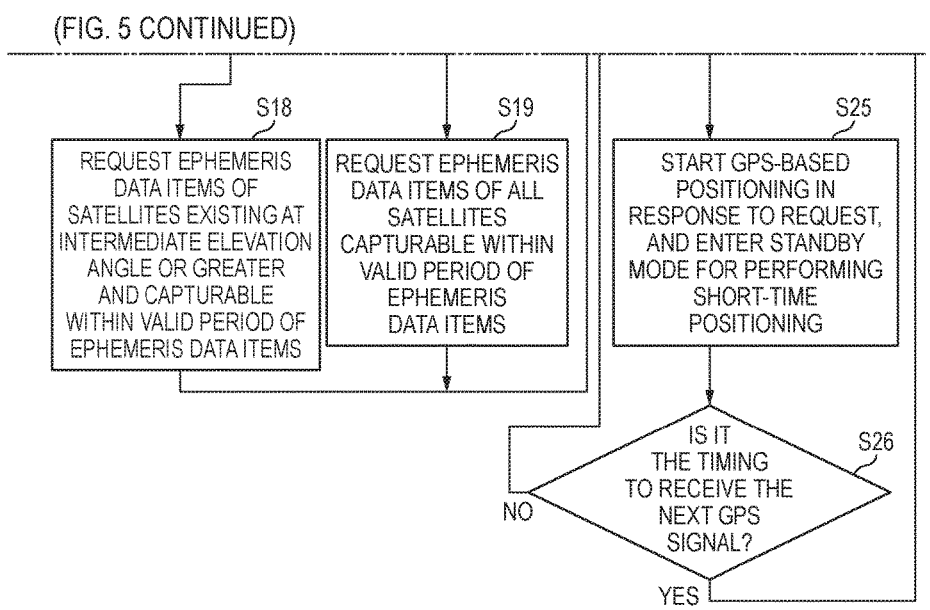

FIG. 5 is a flow chart for explaining the flow of a positioning control process which is performed by the GPS logger 1 and the smart phone 2 shown in FIG. 1 and having the functional components of FIG. 4.

If a user operates the input unit 17 for starting the positioning control process, the positioning control process is started.

In STEP S11, the stop determining unit 51 determine whether the GPS logger 1 is still.

In a case where the GPS logger 1 is still, the determination result of STEP S11 becomes "YES", and the process proceeds to STEP S12.

Meanwhile, in a case where the GPS logger 1 is not still, the determination result of STEP S11 becomes "NO", and the process proceeds to STEP S13.

In STEP S12, the processing unit 53 stops requesting ephemeris data items. In other words, as long as the GPS logger 1 is still, since there is no change in the location, GPS-based positioning is not performed. After STEP S12, the process proceeds STEP S11.

In STEP S13, the battery-charge-level determining unit 52 determines whether the battery charge level is lower than a predetermined threshold.

In a case where the battery charge level is lower than the predetermined threshold, the determination result of STEP S13 becomes "YES", and the process proceeds to STEP S14.

Meanwhile, in case where the battery charge level is equal to or higher than the predetermined threshold, the determination result of STEP S13 becomes "NO", and the process proceeds to STEP S20.

In STEP S14, the processing unit 53 determines whether it is possible to specify the current location by the smart phone 2.

In a case where it is possible to specify the current location by the smart phone 2, the determination result of STEP S14 becomes "YES", and the process proceeds to STEP S16.

Meanwhile, in a case where it is not possible to specify the current location by the smart phone 2, the determination result of STEP S14 becomes "NO", and the process proceeds to STEP S15.

In STEP S15, the processing unit 53 determines whether it is possible to specify the current location based on the result of the latest GPS-based positioning.

In a case where it is possible to specify the current location based on the result of the latest GPS-based positioning, the determination result of STEP S15 becomes "YES", and the process proceeds to STEP S19.

Meanwhile, in a case where it is not possible to specify the current location based on the result of the latest GPS-based positioning, the determination result of STEP S15 becomes "NO", and the process proceeds to STEP S20.

In STEP S16, the processing unit 53 determines whether the current location is a commanding place such as a park. At this time, with reference to some information such as map information stored in the smart phone 2 or map information loaded through the smart phone 2, the processing unit 53 can determine whether the current location is a commanding place.

In a case where the current location is a commanding place such as a park, the determination result of STEP S16 becomes "YES", and the process proceeds to STEP S17.

Meanwhile, in a case where the current location is not a commanding place such as a park, the determination result of STEP S16 becomes "NO", and the process proceeds to STEP S19.

In STEP S17, the processing unit 53 determines whether the GPS antenna is directed toward the sky.

In a case where the GPS antenna is directed toward the sky, the determination result of STEP S17 becomes "YES", and the process proceeds to STEP S18.

Meanwhile, in a case where the GPS antenna is not directed toward the sky, the determination result of STEP S17 becomes "NO", and the process proceeds to STEP S19.

In STEP S18, the processing unit 53 requests the smart phone 2 to transmit the ephemeris data items of GPS satellites existing at an intermediate elevation angle or greater and capturable within the valid period of the ephemeris data items.

After STEP S18, the process proceeds to STEP S21.

Figure 8:
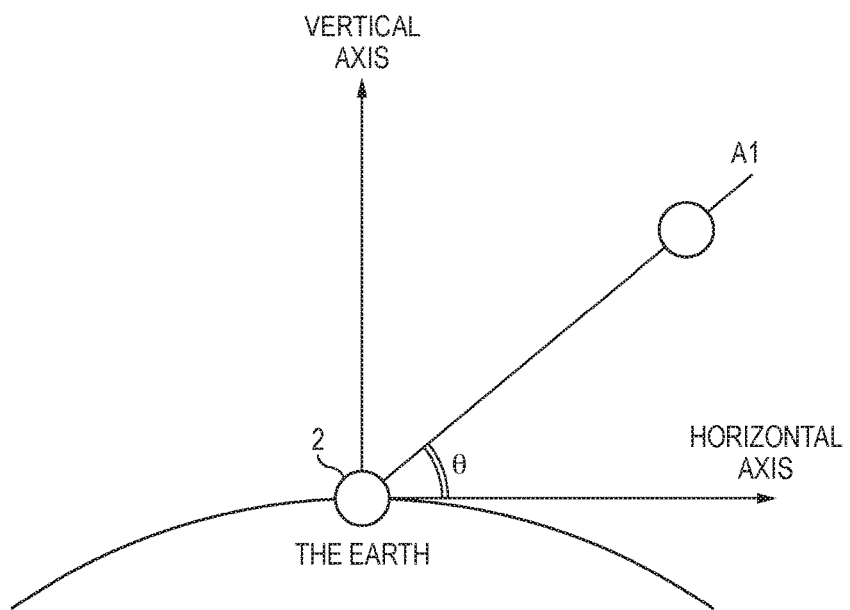
FIG. 8 is a view illustrating the elevation angle between the GPS logger and a GPS satellite in the present invention.

In FIG. 8, the elevation angle θ between the smart phone 2 and a GPS satellite A1 is shown.

In STEP S19, the processing unit 53 requests the smart phone 2 to transmit the ephemeris data items of all GPS satellites capturable within the valid period of the ephemeris data items.

In STEP S20, the processing unit 53 requests the smart phone 2 to transmit the ephemeris data items of all GPS satellites.

In STEP S21, the ephemeris transmitting unit 153 transmits the ephemeris data items in response to the request of the GPS logger 1. After the ephemeris acquiring unit 151 acquires ephemeris data items of GPS satellites requested in any one of STEPS S18, S19, and S20, and the format conversion unit 152 performs format conversion on the ephemeris data items, the ephemeris data items are transmitted in STEP S21.

In STEP S22, if reception of the ephemeris data items is completed, the mode setting unit 55 turns off the communication mode (here, Bluetooth) used in communication with the smart phone 2.

In STEP S23, the GPS-signal reception control unit 54 starts GPS-based positioning of the positioning unit 16 using the ephemeris data items received in STEP S24, and the mode setting unit 55 sets an interval required until reception of the next GPS signal (updating of the ephemeris data items). At this time, since the ephemeris data items received from the smart phone 2 are used as described above, in the GPS logger 1 can perform short-time positioning (hot start) at a long interval. Also, since the number of search engines to be operated and the number of the tracking engines to be operated change according to the number of ephemeris data items to be used GPS positioning, GPS-based positioning is performed with lower power consumption.

In STEP S24, the GPS-signal reception control unit 54 stops GPS-based positioning, and the timer unit 61 measures (counts down) the time until reception of the next GPS signal.

In STEP S25, if GPS-based positioning is requested by an operation on the input unit 17 or the like, the mode setting unit 55 starts GPS-based positioning, and enters a standby mode for perforating short-time positioning (hot start). In a case where GPS-based positioning has been requested, if GPS positioning is completed, or in response to a time-out, the mode setting unit 55 stops GPS-based positioning.

In STEP S26, the mode setting unit 55 determines whether it is the timing to receive the next GPS signal (the interval has elapsed). Specifically, the mode setting unit 55 determines whether an activation notification signal has been input from the activation notifying unit 62.

In a case where it is the timing to receive the next GPS signal, the determination result of STEP S26 becomes "YES", and the process proceeds to STEP S11.

Meanwhile, in a case where it is not the timing to receive the next GPS signal, the determination result of STEP S26 becomes "NO", and the process proceeds to STEP S24.

By this process, in the GPS logger 1, the following elects are achieved.

In other words, since ephemeris data items for performing GPS-based positioning using short-time positioning (hot start) are extracted from A-GPS data or the like transmitted for mobile phones such as smart phones, and format conversion is performed on the ephemeris data items such that the ephemeris data items can be used in the GPS logger 1, it is possible to perform short-time positioning while reducing power consumption as compared to a case of acquiring ephemeris data items by actual measurement.

Also, since the user does not need to concern about acquisition of ephemeris data items, and the number of necessary ephemeris data items is determined according to the battery charge level, and ephemeris data items corresponding to the determined number are adaptively acquired, it is possible to achieve both of lower power consumption and convenience.

In a case of acquiring ephemeris data items by actual measurement, since the ephemeris data items of actually visible satellites are acquired, even though a new satellite appears after updating (acquisition) of ephemeris data items, the new satellite cannot be used in GPS-based positioning using short-time positioning (hot start), and influences the accuracy of positioning. Meanwhile, in the present invention, even though anew satellite appears after updating of ephemeris data items, the ephemeris data item thereof can be acquired. Therefore, it is possible to improve the accuracy of positioning. Also it is possible to set longer intervals for intermittently performing GPS-based positioning.

Now, with reference to FIGS. 6 and 7, the outline of the power reduction effect of the present invention will be described.

Figure 6:
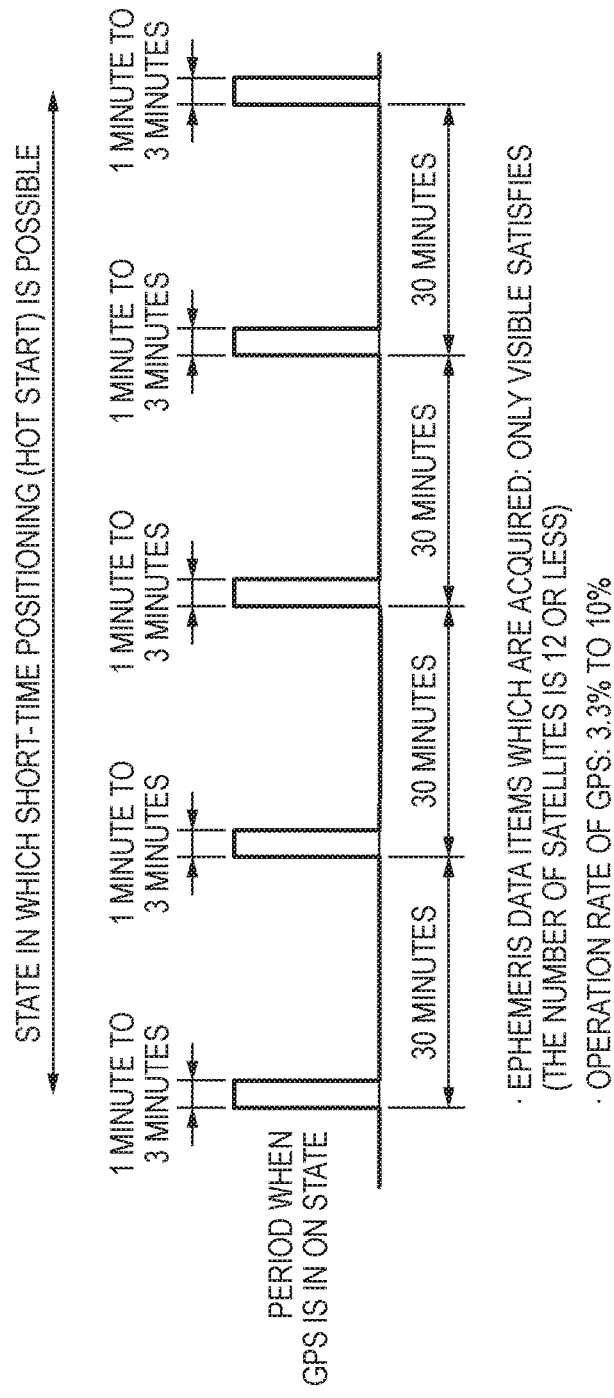
FIG. 6 is a schematic diagram illustrating the sequence of intermittent positioning control of a GPS logger of a related art in a case where short-time positioning is possible.

FIG. 6 is a schematic diagram illustrating the sequence of intermittent positioning control of a GPS logger of the related art in a case where short-time positioning is possible.

Figure 7:
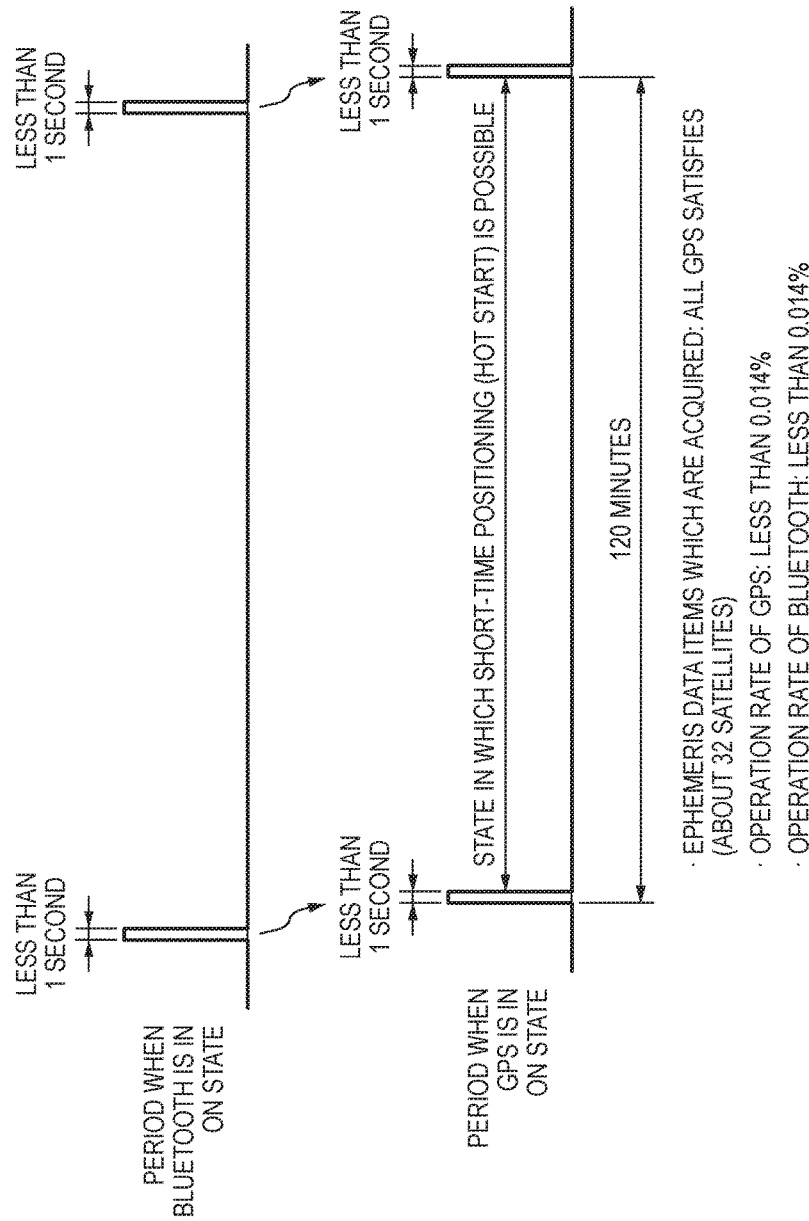
FIG. 7 is a schematic diagram illustrating the sequence of intermittent positioning control of the present invention in a case where short-time positioning is possible.

Also, FIG. 7 is a schematic diagram illustrating the sequence of intermittent positioning control of the present invention in a case of performing short-time positioning.

As shown in FIG. 6, in the intermittent positioning control of the GPS logger of the related art, only the ephemeris data items of GPS satellites visible from the GPS logger (for example, the number of GPS satellites is equal to or less than 12) are acquired. Therefore, in order to always maintain ephemeris data items necessary for short-time positioning (hot start), the GPS logger should receive GPS signals for about 1 minute to 3 minutes at intervals of about 30 minutes.

In this case, if it is assumed that the power consumption of GPS positioning is 100 mW, the average power consumption of the GPS logger of the related art is 3.3 (mW) to 10.0 (=100 (mW)×[Operation Rate (3.3% to 10%)]).

Meanwhile, as shown in FIG. 7, in the intermittent positioning control of the GPS logger 1 of the present invention, power consumption is required to receive ephemeris data items from the smart phone 2 and receive GPS signals.

Since the ephemeris data item of one satellite is 420 bits, in a case of receiving the ephemeris data items of all of 32 satellites, the total amount of data becomes 13440 bits (=420 (bits)×32 (which is the number of satellites)).

If it is assumed that the actual communication rate of Bluetooth is 400 kbps, a communication time for receiving the ephemeris data items of all of 32 satellites from the smart phone 2 becomes 33.6 milliseconds.

Also, in a case of performing communication using Bluetooth low energy (BLE), if it is assumed that the actual communication rate is 28.8 kbps, a communication time for receiving the ephemeris data items of all of 32 satellites from the smart phone 2 becomes 0.47 milliseconds.

Therefore, it is possible to assume that the time required to receive the ephemeris data items of all of 32 satellites from the smart phone 2 is equal to or less than 1 second even though various latencies are included.

If intervals of ephemeris data updating (GPS signal reception) are set to intervals of 120 minutes, the operation rate of Bluetooth becomes 0.014% (=1 (second)/(120 (minutes)× 60 (seconds))).

Also, with respect to the operation rate of the GPS, it can be assumed that the actual communication rate of the GPS is 90 kbps. In this case, a communication time for receiving the ephemeris data items (13440 bits) of all of 32 satellites becomes 14.9 milliseconds.

Therefore, it is possible to assume that the time required to receive the ephemeris data items of all of 32 satellites is equal to or less than 1 second even though various latencies are included.

If intervals of ephemeris data updating (GPS signal reception) are set to intervals of 120 minutes, the operation rate of the GPS becomes 0.014% (=1 (second)/(120 (minutes)× 60 (seconds))).

In this case, if it is assumed that the power consumption of communication using Bluetooth is 50 mW, and the power consumption of GPS-based positioning is 100 mW, the average power consumption of the GPS logger 1 becomes 0.021 mW (=100 (mW)×[Operation Rate (0.014%)]+50 (mW)×[Operation Rate (0.014%)]).

Therefore, in the GPS logger 1 of the present invention, the rate of reduction in the power for maintaining short-time positioning (hot start) becomes at least 99.4% to 99.8%.

Also, in the above described calculation, the case of using the ephemeris data items of 32 satellites in GPS-based positioning has been exemplified. However, in a case of acquiring the ephemeris data items of less GPS satellites as shown in STEPS S18 and S19 of the positioning control process, it is possible to further reduce the power consumption.

The GPS logger 1 configured as described above includes the ephemeris acquiring unit 151, the battery-charge-level detecting unit 23, the second CPU 11*b*, and the positioning unit 16.

The ephemeris acquiring unit 151 is configured to be able to acquire ephemeris data items from an external device.

The battery-charge-level detecting unit 23 detects the battery charge level.

The second CPU 11*b* performs a determining process of determining whether the battery charge level detected by the battery-charge-level detecting unit 23 is lower than the predetermined threshold, and performs a control process of controlling ephemeris data acquisition of the ephemeris acquiring unit 151 according to the positioning-satellite signal reception state of a current location if it is determined that the battery charge level is lower than the predetermined threshold.

The positioning unit 16 detects the current location based on the ephemeris data items acquired by the ephemeris acquiring unit 151 and the ephemeris data items received from the positioning satellites.

In this way, the number of necessary ephemeris data items is determined according to the battery charge level and the positioning-satellite signal reception state, and ephemeris data items according to the determined number are adaptively acquired.

Therefore, it becomes possible to intermittently perform positioning at long intervals, and it becomes possible to implement short-time positioning with low power consumption.

The second CPU 11*b* performs an intermittent control process of intermittently activating the ephemeris data receiving operation of the positioning unit 16.

During the ephemeris data receiving operation activated by the intermittent control process, based on the ephemeris data items acquired by the ephemeris acquiring unit 151, the positioning unit 16 performs detection of the current location based on short-time positioning.

Therefore, it becomes possible to intermittently perform positioning at long intervals, and it becomes possible to implement short-time positioning with low power consumption.

In a case where it is determined that the battery charge level detected by the battery-charge-level detecting unit 23 is equal to or higher than the predetermined threshold, in the control process, the second CPU 11b performs a process of controlling the ephemeris acquiring unit 151 such that the ephemeris acquiring unit acquires the ephemeris data items of all satellites.

Therefore, in a case where the remaining battery charge is sufficient, it is possible to perform more accurate positioning.

Also, in the control process, the second CPU 11b determines whether the current location is a place having a good signal reception, based on map information, and performs a process of controlling ephemeris acquisition of the ephemeris acquiring unit 151 according to the signal reception condition.

Therefore, it becomes possible to more efficiently perform positioning.

In the control process, in a case of determining that the current location is a place having a good signal reception condition, the second CPU 11b determines whether the signal reception state (such as the antenna direction) of the positioning unit 16 is good. In a case of determining that the signal reception state is good, the second CPU performs a process of acquiring only the ephemeris data items of satellites existing at a predetermined elevation angle or greater and capturable within the valid period of the ephemeris data items.

Therefore, it becomes possible to more efficiently perform positioning.

Further, in the control process, the second CPU 11b determines whether it is possible to specify the current location by the smart phone 2. In a case of determining that it is not possible to specify the current location by the smart phone 2, the second CPU determines whether it is possible to specify the current location based on the result of the latest positioning. In a case of determining that it is not possible to specify the current location based on the result of the latest positioning, the second CPU performs a process of acquiring the ephemeris data items of all satellites.

Therefore, it becomes possible to suppress a situation in which the ephemeris data items of all satellites are acquired, and more efficiently perform positioning.

In the control process, in a case of determining that it is possible to specify the current location based on the result of the latest positioning, the second CPU 11b performs a process of acquiring only the ephemeris data items of satellites capturable within the valid period of the ephemeris data items.

Therefore, it becomes possible to more efficiently perform positioning.

In the control process, in a case of determining that the current location is not a place having a good signal reception condition, or in a case of determining that the signal reception state of the positioning unit 16 is not good, the second CPU 11b performs a process of acquiring only the ephemeris data items of satellites capturable within the valid period of the ephemeris data items.

Therefore, it becomes possible to more efficiently perform positioning.

Also, the present invention is not limited to the embodiment described above, and modifications, improvements, and the like made within a range in which it is possible to achieve the object of the present invention are included in the present invention.

In the above described embodiment, the case of performing positioning by the GPS has been described as an example. However, the present invention is not limited thereto. For example, the present invention can be applied to various positioning systems using satellites, such as GLONASS of Russia, Galileo of Europe, and BeiDou of China.

Also, in the above described embodiment, the intervals of intermittent GPS-based positioning are set to intervals of 120 minutes. However, the present invention is not limited thereto. For example, the intervals of intermittent GPS-based positioning can be appropriately set according to the degree of reduction in the power consumption, the GPS signal reception state, and the like.

Also, in the above described embodiment, in a case where the battery charge level is lower than the predetermined threshold, the number of ephemeris data items to be requested to be transmitted from the smart phone 2 is reduced. However, the present invention is not limited thereto. For example, even in a case where the battery charge level is equal to or higher than the predetermined threshold, and the remaining battery charge is sufficient, the process of reducing the number of ephemeris data items to be requested to be transmitted from the smart phone 2 may be performed.

Also, in the above described embodiment, the GPS logger according to the present invention has been described as an example. However, the present invention is not particularly limited thereto.

For example, the present invention can be generally applied to electronic devices having positioning functions. Specifically, for example, the present invention can be applied to various devices such as a digital camera, a notebook type perspective conversion, a printer, a television set, a video camera, a mobile navigation device, a mobile phone, a smart phone, and a portable game machine.

The series of processes described above can be performed by hardware, and can also be performed by software.

In other words, the functional configuration of FIG. 4 is merely illustrative, and does not particularly limit the present invention. That is, the GPS logger 1 needs only to have a function capable of performing the series of processes described above, as a whole, and functional blocks usable for implementing that function are not particularly limited to the example of FIG. 4.

Also, one functional block may be configured by only hardware, or may be configured by only software, or may be configured by a combination of hardware and software.

In a case of performing the series of processes by software, a program constituting the software is installed from a network or a recording medium into a computer or the like.

The computer may be a computer integrated in dedicated hardware. Alternatively, the computer may be a computer which can perform various functions by installing by various programs, for example, a general-purpose computer.

A recording medium retaining that program can be configured by the removable medium 31 of FIG. 1 which is distributed separately from the device in order to provide the program to the user, and can also be configured by a recording medium or the like which is provided to the user in a state where it is installed in the device in advance. The removable medium 31 may be composed of, for example, a magnetic disk (including a floppy disk), an optical disk, or a magneto-optical disk. An optical disk is compose of, for example, a compact disk-read only memory (CD-ROM), a digital versatile disk (DVD), or a Blu-ray (registered as a trade mark) disc. A magneto-optical disk is composed of a Mini-Disk (MD) or the like. Also, a recording medium which is provided to the user in a state where it is installed in the device in advance may be composed of, for example, the ROM 12 of FIG. 2 or the hard disk of storage unit 20 of FIG. 2 retaining programs.

Also, in this specification, steps describing programs to be recorded in a recording medium include not only processes which are performed in the order of them in a time series, but also processes which are performed in parallel or individually.

Also, in this specification, the term "system" mans an overall system composed of a plurality of devices, a plurality of means, and so on.

Although some embodiments of the present invention have been described above, those embodiments are merely illustrative and do not limit the technical range of the present invention. The present invention can take other various embodiments, and various modifications such as omission and replacement can be made without departing the gist of the present invention. These embodiments and modifications are included in the scope and gist of the invention described in this specification and the like, and are included in the scope of the inventions disclosed in claims and their equivalents.

What is claimed is:

1. A method comprising:
   determining, by a processor of a positioning device, whether a battery charge level of the positioning device is lower than a threshold; and
   in response to determining that the battery charge level of the positioning device is lower than the threshold, performing, by the processor, at least:
      determining a signal reception state of positioning satellites at a current location of the positioning device;
      determining, based on the signal reception state determined, a number of positioning satellite information item to acquire from an external device, from among positioning satellite information items of detectable positioning satellites, within a valid period during which information from the number of positioning satellite information item can be utilized to determine an updated current location of the positioning device;
      controlling a communication circuit of the positioning device to make a request to the external device for the number of positioning satellite information item determined;
      controlling the communication circuit to acquire the number of positioning satellite information item requested from the external device; and
      determining the updated current location of the positioning device based on the number of positioning satellite information item acquired.

2. The method according to claim 1, comprising:
   controlling the communication circuit, by the processor, to intermittently acquire the number of positioning satellite information item from the external device during a corresponding period; and
   determining, by the processor, the updated current location of the positioning device by using short-time positioning based on the number of positioning satellite information item acquired in the corresponding period.

3. The method according to claim 1, comprising:
   in response to determining that the battery charge level of the positioning device is equal to or higher than the threshold, performing, by the processor, at least:
      controlling the communication circuit to make a request to the external device for positioning satellite information items of all positioning satellites;
      controlling the communication circuit to acquire the positioning satellite information items of all positioning satellites from the external device; and
      determining the updated current location of the positioning device based on the positioning satellite information items of all positioning satellites acquired.

4. The method according to claim 1,
   wherein determining, by the processor, the number of positioning satellite information item to acquire from the external device comprises:
      determining whether the current location is a place with a signal reception condition, based on map information; and
      determining, based on a result of the determination of whether the current location is the place with the signal reception condition, the number of positioning satellite information item to acquire from the external device from among the positioning satellite information items of detectable positioning satellites, within the valid period.

5. The method according to claim 4,
   wherein determining, by the processor, the number of positioning satellite information item to acquire from the external device comprises:
      in response to determining that the current location is the place with the signal reception condition:
         determining, by the processor, whether the signal reception state is a predetermined state; and
         in response to determining that the signal reception state is the predetermined state, determining to acquire from the external device at least one positioning satellite information item of detectable positioning satellites existing at an elevation angle or greater, within the valid period.

6. The method according to claim 1, comprising:
   determining, by the processor, whether it is possible to determine the current location of the positioning device using at least one position satellite information item acquired from the external device; and
   in response to determining that it is not possible to determine the current location of the positioning device using at least one position satellite information item acquired from the external device:
      determining, by the processor, whether it is possible to determine the current location of the positioning device, based on the latest positioning of the positioning device; and
      in response to determining that it is not possible to determine the current location of the positioning device based on the latest positioning of the positioning device, controlling the communication circuit, by the processor, to make a request to the external device to acquire positioning satellite information items of all positioning satellites.

7. The method according to claim 6, comprising:
   in response to determining that it is possible to determine the current location of the positioning device based on the latest positioning of the positioning device, controlling the communication circuit, by the processor, to make a request to the external device for positioning satellite information item of all detectable positioning satellites within the valid period.

8. The method according to claim 4,
wherein determining the number of positioning satellite information item to acquire from the external device comprises:
determining, by the processor, whether the signal reception state is a predetermined state; and
in response to determining that the current location of the external device is not the place with the signal reception condition, or in response to determining that the signal reception state is not the predetermined state, determining, by the processor, to acquire positioning satellite information item of all detectable positioning satellites within the valid period.

9. A positioning device comprising:
a processor configured to:
determine whether a battery charge level of the positioning device is lower than a threshold; and
in response to determining that the battery charge level of the positioning device is lower than the threshold:
determine a signal reception state of positioning satellites at a current location of the positioning device;
determine, based on the signal reception state determined, a number of positioning satellite information item to acquire from an external device from among positioning satellite information items of detectable positioning satellites, within a valid period during which information from the positioning satellite information item can be utilized to determine an updated current location of the positioning device;
control a communication circuit of the positioning device to make a request to the external device for the number of positioning satellite information item determined;
control the communication circuit to acquire the number of positioning satellite information item requested from the external device; and
determine the updated current location of the positioning device based on the number of positioning satellite information item acquired.

10. The positioning device according to claim 9,
wherein the processor is configured to:
control the communication circuit to intermittently acquire the number of positioning satellite information item from the external device during a corresponding period; and
determine the updated current location of the positioning device by using short-time positioning based on the number of positioning satellite information item acquired in the corresponding period.

11. The positioning device according to claim 9,
wherein the processor is configured to, in response to determining that the battery charge level of the positioning device is equal to or higher than the threshold:
control the communication circuit to make a request to the external device for positioning satellite information items of all positioning satellites;
control the communication circuit to acquire the positioning satellite information items of all positioning satellites from the external device; and
determine the updated current location of the positioning device based on the positioning satellite information items of all positioning satellites acquired.

12. The positioning device according to claim 9, wherein:
wherein the processor is configured to determine the number of positioning satellite information item to acquire from the external device by performing at least:
determine whether the current location is a place with a signal reception condition, based on map information; and
determine, based on a result of the determination of whether the current location is the place with the signal reception condition, the number of positioning satellite information item to acquire from the external device from among the positioning satellite information items of detectable satellites, within the valid period.

13. The positioning device according to claim 12,
wherein the processor is configured to determine the number of positioning satellite information item to acquire from the external device by performing at least:
in response to determining that the current location is the place with the signal reception condition,
determine whether the signal reception state is a predetermined state; and
in response to determining that the signal reception state is the predetermined state, determine to acquire from the external device at least one positioning satellite information item of detectable positioning satellites existing at an elevation angle or greater within the valid period.

14. The positioning device according to claim 9,
wherein the processor is configured to:
determine whether it is possible to determine the current location of the positioning device using position at least one position satellite information item acquired from the external device; and
in response to determining that it is not possible to determine the current location of the positioning device using at least one position satellite information item acquired from the external device:
determine whether it is possible to determine the current location of the positioning device, based on the latest positioning of the positioning device; and
in response to determining that it is not possible to determine the current location of the positioning device based on the latest positioning of the positioning device, control the communication circuit to make a request to the external device to acquire positioning satellite information items of all positioning satellites.

15. The positioning device according to claim 14,
wherein the processor is configured to, in response to determining that it is possible to determine the current location of the positioning device based on the latest positioning of the positioning device, control the communication circuit to make a request to the external device for positioning satellite information item of all detectable positioning satellites within the valid period.

16. The positioning device according to claim 12,
wherein the processor is configured to determine the number of positioning satellite information item to acquire from the external device by performing at least:
determine whether the signal reception state is a predetermined state; and
in response to determining that the current location of the external device is not the place with the signal reception condition, or in response to determining that the signal reception state is not the predetermined state, determine to acquire positioning satellite information item of all detectable positioning satellites within the valid period.

17. A non-transitory computer readable storage medium storing a program for determining an updated current location of a positioning device, wherein the program causes a computer of the positioning device to at least perform:
    determining, by the computer of the positioning device, whether a battery charge level of the positioning device is lower than a threshold; and
    in response to determining that the battery charge level of the positioning device is lower than the threshold:
        determining, by the computer, a signal reception state of positioning satellites at a current location of the positioning device;
        determining, based on the signal reception state determined, by the computer, a number of positioning satellite information item to acquire from an external device from among positioning satellite information items of detectable positioning satellites, within a valid period during which information from the number of positioning satellite information items can be utilized to determine an updated current position of the positioning device;
    controlling a communication circuit of the positioning device, by the computer, to make a request to the external device for the number of positioning satellite information item determined;
    controlling the communication circuit, by the computer, to acquire the number of positioning satellite information item requested from the external device; and
    determining, by the computer, the updated current location of the positioning device based on the number of positioning satellite information item acquired.

\* \* \* \* \*